(12) United States Patent
Carl et al.

(10) Patent No.: US 11,163,072 B2
(45) Date of Patent: Nov. 2, 2021

(54) DEVICE FOR CONTACTLESSLY DETERMINING THE STRAIGHTNESS OF AT LEAST ONE LONG PRODUCT AND METHOD FOR CALIBRATING A DEVICE OF THIS TYPE

(71) Applicant: FRAUNHOFER-GESELLSCHAFT ZUR FÖRDERUNG DER ANGEWANDTEN FORSCHUNG E.V., Munich (DE)

(72) Inventors: Daniel Carl, Emmendingen (DE); Volker Jetter, Breisach (DE); Tobias Schmid-Schirling, Freiburg (DE)

(73) Assignee: Fraunhofer-Gesellschaft Zur Förderung Der Angewandten Forschung E.V., Munich (DE)

( * ) Notice: Subject to any disclaimer, the term of this patent is extended or adjusted under 35 U.S.C. 154(b) by 10 days.

(21) Appl. No.: 15/777,542

(22) PCT Filed: Jun. 30, 2017

(86) PCT No.: PCT/EP2017/066339
§ 371 (c)(1),
(2) Date: May 18, 2018

(87) PCT Pub. No.: WO2019/001738
PCT Pub. Date: Jan. 3, 2019

(65) Prior Publication Data
US 2021/0173098 A1 Jun. 10, 2021

(51) Int. Cl.
*G01T 1/17* (2006.01)
*G01S 7/497* (2006.01)
*G01S 17/88* (2006.01)

(52) U.S. Cl.
CPC ............. *G01T 1/17* (2013.01); *G01S 7/497* (2013.01); *G01S 17/88* (2013.01)

(58) Field of Classification Search
CPC ............ G01T 1/17; G01S 7/497; G01S 17/88
See application file for complete search history.

(56) References Cited

U.S. PATENT DOCUMENTS 4,120,093 A * 10/1978 Spies .................. G01B 5/0009
33/533
4,201,476 A 5/1980 Musto et al.
(Continued)

FOREIGN PATENT DOCUMENTS

DE 197 41 730 4/1999
EP 0309611 A1 4/1989
(Continued)

OTHER PUBLICATIONS

International Preliminary Report on Patentability received for PCT Patent Application No. PCT/EP2017/066339, dated Jan. 9, 2020, 20 pages (11 pages of English Translation and 9 pages of Original Document).

(Continued)

*Primary Examiner* — Hugh Maupin
(74) *Attorney, Agent, or Firm* — Faegre Drinker Biddle & Reath LLP

(57) ABSTRACT

A device for contactlessly determining the straightness of at least one long product, where punctiform or linear measuring radiation is moved by a radiation source module over the long product at least transversely to the longitudinal direction of the long product during a measuring cycle. The intensity of detection radiation coming from an area of incidence of the measuring radiation is recorded by a radiation detection module in a time-resolved manner and is supplied to a control and evaluation unit. The spatial position of the areas of incidence and thus the straightness of a long product can be determined from location information regarding the areas of incidence in the longitudinal direction and from characteristic intensity values of the detection (Continued)

radiation. For a calibration, a reference straightness can be determined by carrying out multiple measuring cycles by rotating a long product of unknown straightness.

16 Claims, 12 Drawing Sheets

(56) References Cited

U.S. PATENT DOCUMENTS

| | | |
|---|---|---|
| 5,473,436 A | 12/1995 | Fukazawa |
| 7,110,910 B1 | 9/2006 | Deffenbaugh et al. |
| 2001/0043333 A1* | 11/2001 | Groot ................. G01B 9/02024 356/511 |
| 2010/0039102 A1* | 2/2010 | Hoelzl ............... G01N 27/9053 324/207.11 |
| 2014/0168414 A1 | 6/2014 | Brumovsky et al. |

FOREIGN PATENT DOCUMENTS

| | | |
|---|---|---|
| JP | S61 128112 | 6/1986 |
| KR | 2011 0078619 | 7/2011 |

OTHER PUBLICATIONS

International Search Report and Written Opinion dated Mar. 28, 2018 in PCT/EP2017/066339.

* cited by examiner

DEVICE FOR CONTACTLESSLY DETERMINING THE STRAIGHTNESS OF AT LEAST ONE LONG PRODUCT AND METHOD FOR CALIBRATING A DEVICE OF THIS TYPE

CROSS-REFERENCE TO RELATED APPLICATIONS

This application is the U.S. national stage of PCT/EP2017/066339, filed on Jun. 30, 2017, the entire disclosure of which is expressly incorporated by reference herein.

BACKGROUND OF THE INVENTION

1. Field of Invention

The present invention relates to a device for contactlessly determining the straightness of at least one long product. The invention further relates to a method for calibrating a device for contactlessly determining the straightness of at least one long product.

2. Description of the Related Art

An exemplary device is known from the product description "STRAIGHTNESS CHECK" by LAP GmbH Laser Applications, Luneburg, Germany, available on 7 Jun. 2017 at Internet address "https://www.lap-laser.com/de/industrie/ihre-aufgabe/messen/geradheit/STRAIGHTNESS-_CHECK_fly_de_1-9_2016-03-03mix2.pdf". The previously known device for contactlessly determining the straightness of at least one long product comprises a plurality of radiation source modules, each of which can emit a light curtain, which is oriented transversely to the longitudinal direction of a long product, as measuring radiation that can be applied to the at least one long product. Furthermore, a number of radiation detectors corresponding to the plurality of radiation source modules is provided, by which the measuring radiation that is modified by the or by each long product at various areas of incidence distributed in the longitudinal direction of the long product can be detected as detection radiation in the form of cast shadows. Using a control and evaluation unit, the straightness of the or of each long product to which measuring radiation is applied can be determined from data generated from the detection radiation in the form of respective offsets of the cast shadows transversely to the longitudinal direction of the long product.

SUMMARY OF THE INVENTION

The present invention addresses the problem of determining the straightness of at least one long product, with which it is possible to achieve a variable, quick and relatively precise determination of the straightness. The invention further addresses the problem of indicating a method for calibrating such a device.

In the device according to the invention for determining straightness, the measuring radiation actively moves transversely to the longitudinal direction of the or of at least one long product. Using information obtained from the control of the active movement about the areas of incidence and characteristic intensity values of the detection radiation coming from the areas of incidence, the straightness can be determined quickly and relatively precisely and also variably when the measuring radiation transverse to the longitudinal direction is moving at different transversal speeds location.

By means of the method according to the invention, reference values for a reference straightness can be identified over multiple measurement cycles without exact knowledge of the straightness of a long product on the basis of significant data from characteristic intensity values of the detection radiation.

The selection of the characteristic intensity values results in a relatively high level of precision in determining straightness. A relatively high level of precision in determining the spatial position of the areas of incidence likewise results from selecting an initial basis for the location information that is coupled directly with the movement of the measuring radiation.

Selecting the measuring radiation as ultraviolet, visible or infrared radiation results in a design that is relatively cost-effect and manageable in day-to-day operations With the device, which has a radiation source module with which measuring radiation can also be moved in the longitudinal direction, the straightness of a long product can be determined with relatively little active movement of the long product in the longitudinal direction.

The device is distinguished by a metrologically simple arrangement for obtaining location information, and the straightness of the long product in question can be determined relatively quickly using the device.

With the device, deviations from straightness can be determined in two dimensions in a long product at rest, and deviations from straightness can also be improved in two directions when radiation source modules are provided on only one side of the particular long product and, at the same time, the precision of the determination of straightness can be improved when radiation source modules that are space apart in the transverse direction are provided.

The selection of the significant data permits a statistically robust determination of the reference straightness.

Further practical configurations and advantages of the invention arise from the following description of embodiments with reference to the figures of the drawing.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
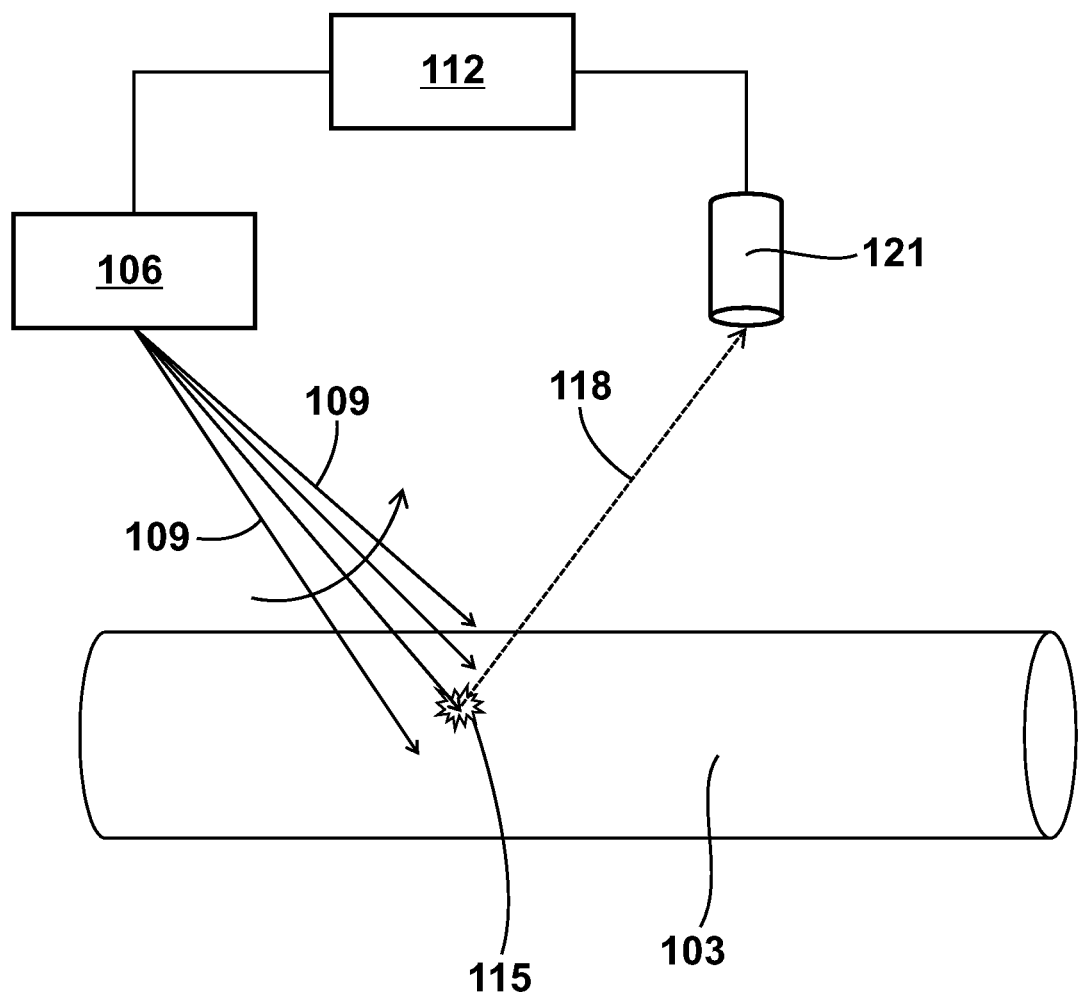
FIG. 1 in a schematic representation, shows an exemplary embodiment of a device according to the invention with a radiation source module, a radiation detector, a control and evaluation unit and a long product, which is configured as a bright steel bar with a round cross-section.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

In a schematic representation, FIG. 1 shows a side view of an exemplary embodiment of a device according to the invention for determining the straightness of a long product in the sense of an object whose extent in a longitudinal direction is significantly greater than perpendicular to the longitudinal direction, i.e., in the transverse direction or in the radial direction, which is shown here in the form of a bright steel bar 103 with a circular cross-section. The exemplary embodiment according to FIG. 1 has a laser scanner 106 as a radiation source module, with which punctiform measuring radiation 109 can be generated, preferably in the ultraviolet, visible or infrared spectral range, and can be moved at a transversal speed transverse to the longitudinal direction of the bright steel bar 103.

The laser scanner 106 is connected to a control and evaluation unit 112, with which, inter alia, the transversal speed of the movement of the measuring radiation 109 can be influenced in the transverse direction of the bright steel bar 103.

When the punctiform measuring radiation 109 strikes the relatively highly reflective surface of the bright steel bar 103, some of the intensity of the measuring radiation 109 from an area of incidence 115, which in this exemplary embodiment covers a relatively small area, is back-scattered in the manner of a reflection as detection radiation 118, whose temporal curve of intensity can be detected by a single-cell radiation detector 121 with a relatively large aperture angle as a radiation detection module.

The radiation detector 121 is likewise connected to the control and evaluation unit 112 and provides to it the temporal curve of the intensity of the detection radiation 118 during a measurement cycle, which is constituted by one complete pass in the transverse direction over the surface of the bright steel bar 103 that faces the laser scanner 106.

Figure 2:
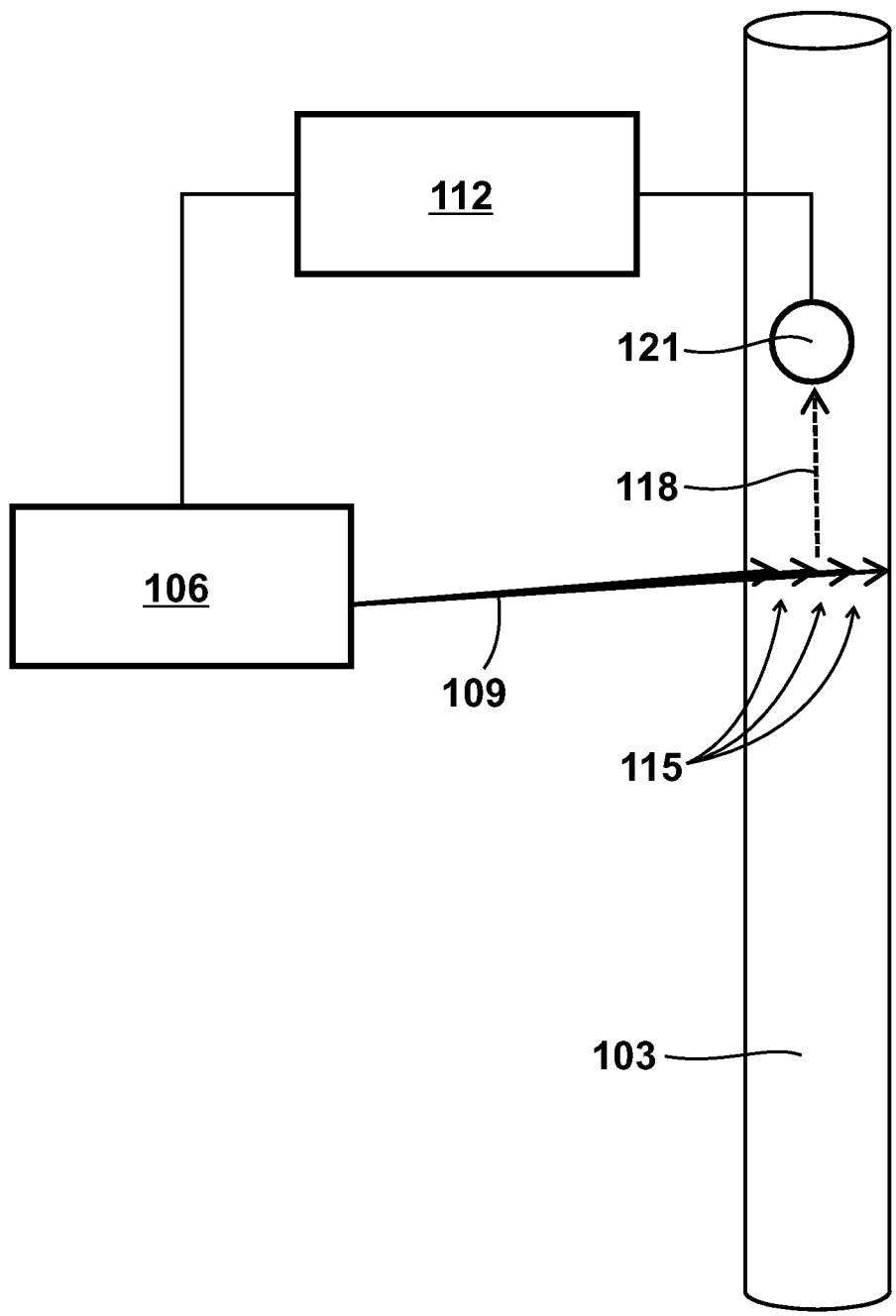
FIG. 2 in a top view, shows the exemplary embodiment according to FIG. 1.
Figure 3:
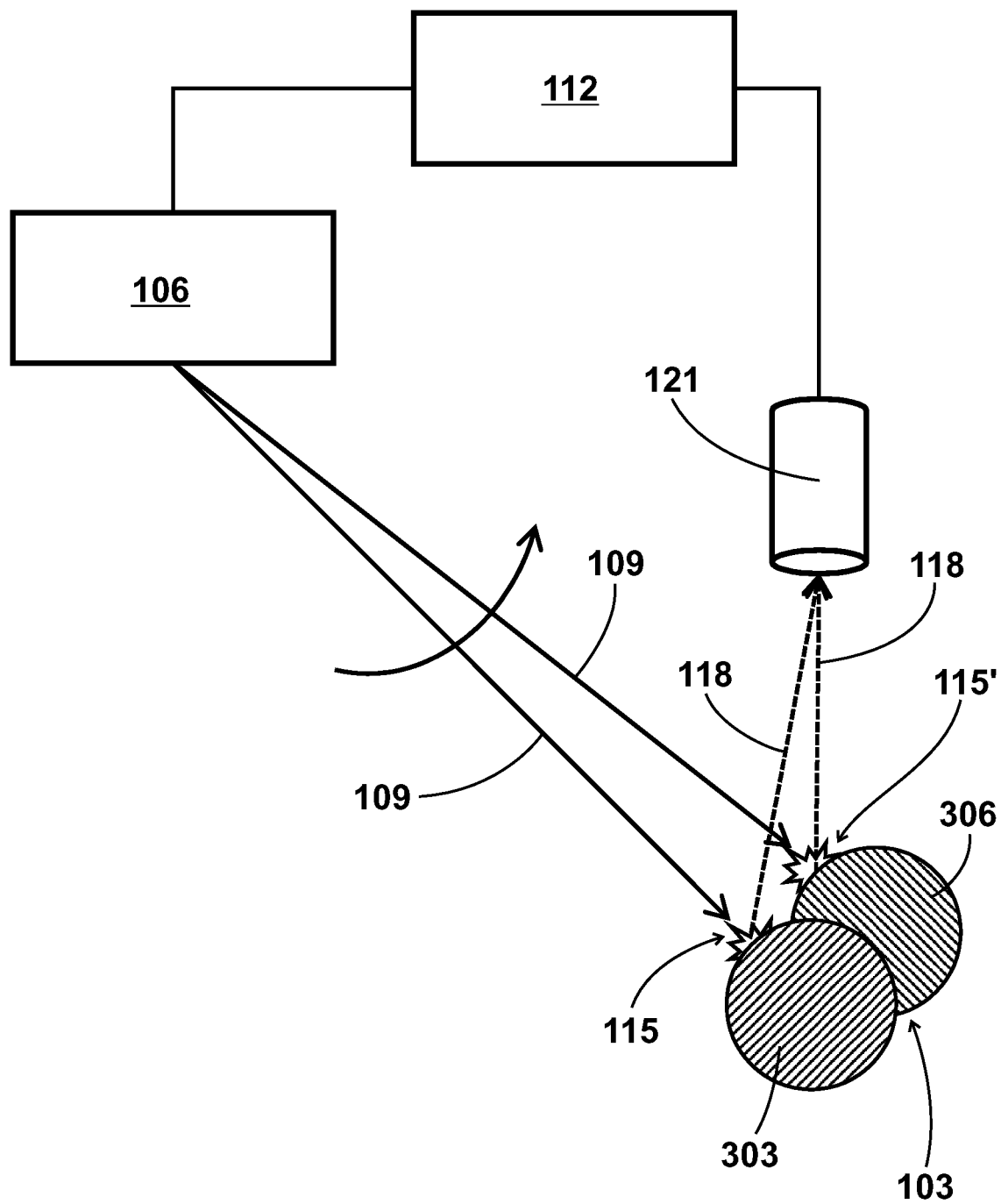
FIG. 3 in an end view, shows the exemplary embodiment according to FIG. 1.

In a schematic representation, FIG. 2 shows the exemplary embodiment according to FIG. 1 in a top view, from which it is clear that the radiation detector 121 is distanced from the areas of incidence 115 in the longitudinal direction of the bright steel bar 103, FIG. 3 shows an end view of the exemplary embodiment according to FIG. 1 having the bright steel bar 103, which is represented here by a first cross-sectional region 303 and a second cross-sectional region 306, which are offset from each other as a result of a deviation from ideal straightness in the bright steel bar 103.

In this way, the areas of incidence 115, 115' in the first cross-sectional area 303 and in the second cross-sectional area 306, which are distanced from each other in the transverse direction of the bright steel bar 103, are located at different distances from the laser scanner 106 and the radiation detector 121, which brings about a different temporal curve in the intensity that is applied to the radiation detector 121.

Figure 4:
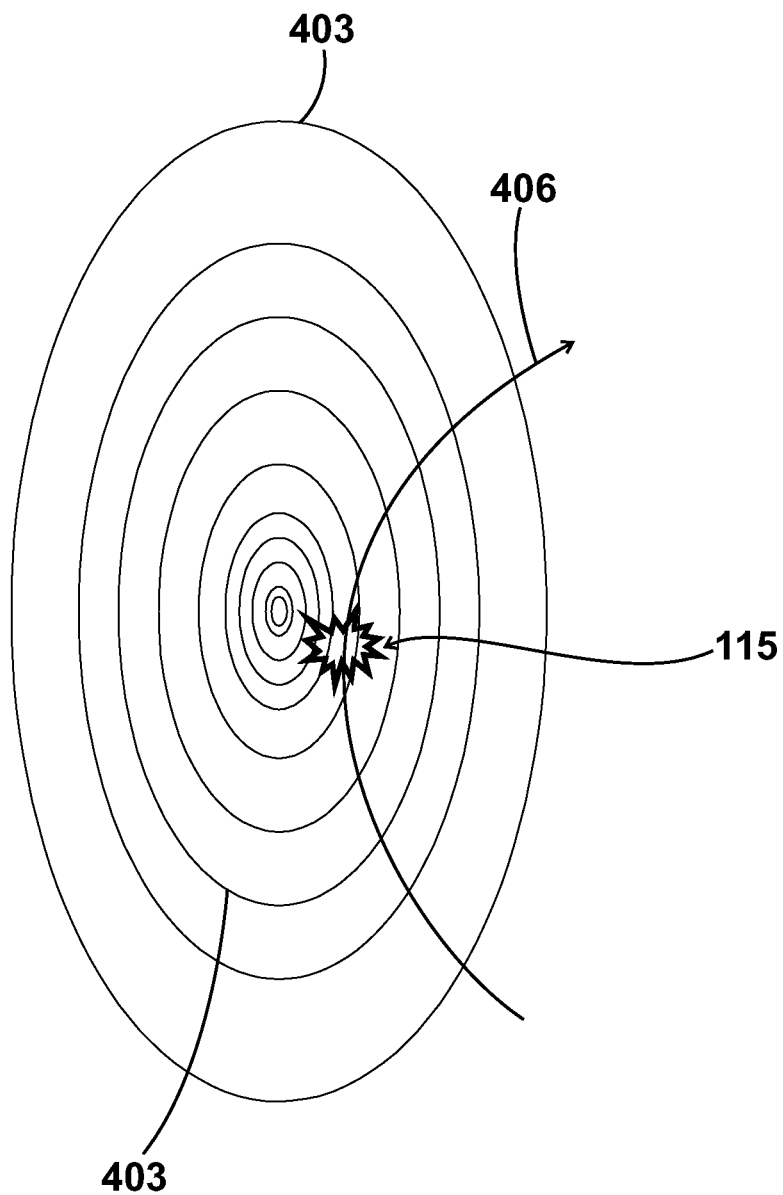
FIG. 4 in a graphic representation, shows isolines of the intensity of back-scattered detection radiation in a long product with a circular cross-section, and the path of the aperture of a radiation detector.

By way of illustration, FIG. 4 shows a plurality of equal-intensity isolines 403 of the intensity of the measuring radiation 109 back-scattered by a bright steel bar 103 with a circular cross-section together with a typical aperture path 406 of the radiation detector 121 with an area of incidence 115 that is drawn as an example in the range of maximum intensity.

It is apparent from the drawing in FIG. 4 that, during a measurement cycle, the temporal curve of intensity of the detection radiation 118 recorded by the radiation detector 121 has a maximum with a temporal position that depends upon the distance of the area of incidence 115 relative to a reference position of an ideally straight long product, here in the form of the bright steel bar 103.

Figure 5:
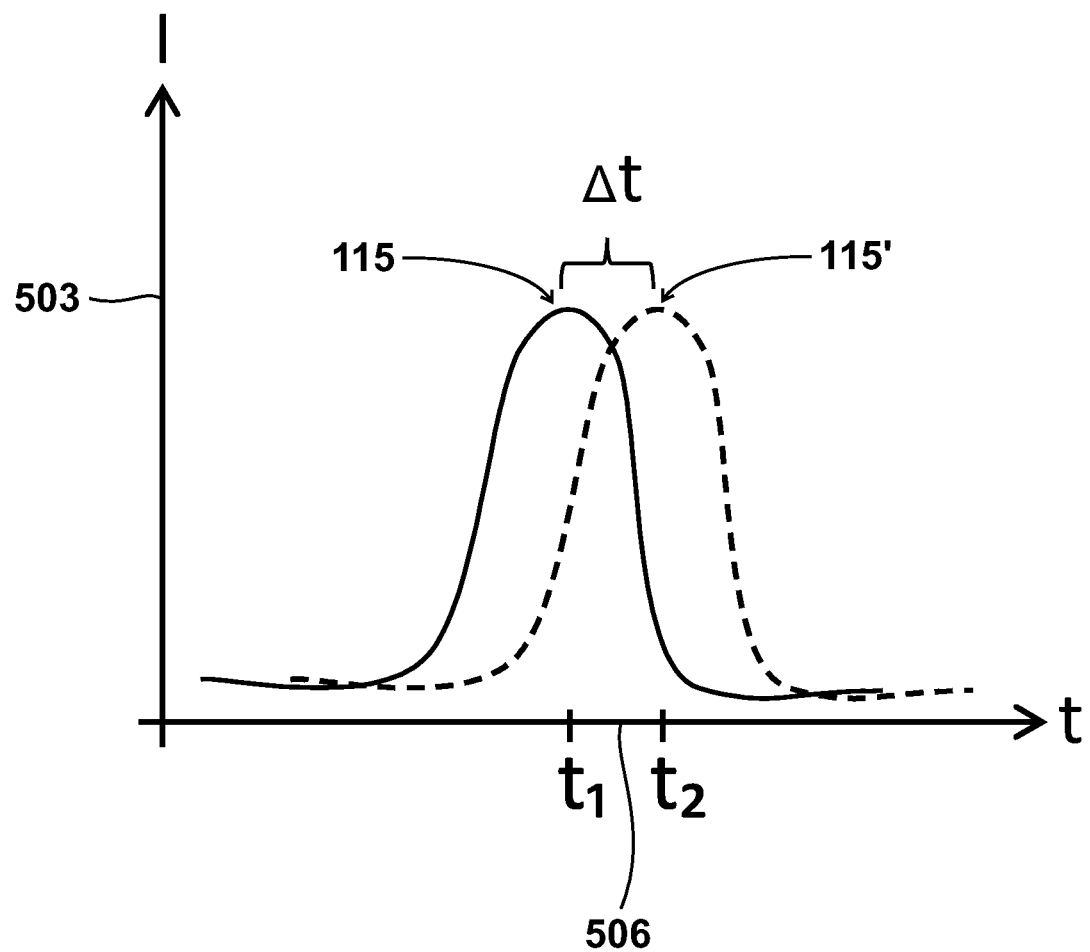
FIG. 5 shows the temporal curve of intensities of detection radiation back-scattered from the areas of incidence of a long product of unknown straightness and of a long product with a reference straightness.

In a schematic representation, FIG. 5 shows the temporal curve of the intensity I of detection radiation 118 plotted on ordinates 503 as a function of the time t plotted on the abscissa 506 when a reference straightness, preferably determined according to the invention as explained below in greater detail, is imposed at times $t_1$ and $t_2$ upon an area of incidence 115 of a bright steel bar 103 whose straightness is to be determined and of an area of incidence 115' of a bright steel bar serving as a reference, wherein the area of incidence 115 of the bright steel bar 103 to be measured is spatially offset from the area of incidence 115' of the bright steel bar serving as a reference. In this exemplary embodiment, the maximum intensities detected by the radiation detector 121 and evaluated as characteristic intensity values are thereby offset by the time $\Delta t = t_2 - t_1$.

From this time $\Delta t$ and with a knowledge of the transversal speed of the measuring radiation 109 and the relative spatial positions of the laser scanner 106 and the radiation detector 121 to each other together with appropriately obtained location information about the areas of incidence 115 in the longitudinal direction, it is possible to determine, for example, the straightness of the long product in question in the form of a radial deviation in length from an ideal straightness per length unit compared to a reference straightness.

Alternatively, or in addition to the maximum intensities, it is also possible to draw upon significant intensity values occurring at edges of an intensity distribution shown in FIG. 5 for use as characteristic intensity values.

In so doing, precision during the determination of straightness can be adjusted as needed by, for example, moving the measuring radiation 109 relatively slowly with a correspondingly long measurement cycle for a relatively high level of precision and moving it relatively fast during a measurement cycle for a measurement that is less exact but is quicker.

Figure 6:
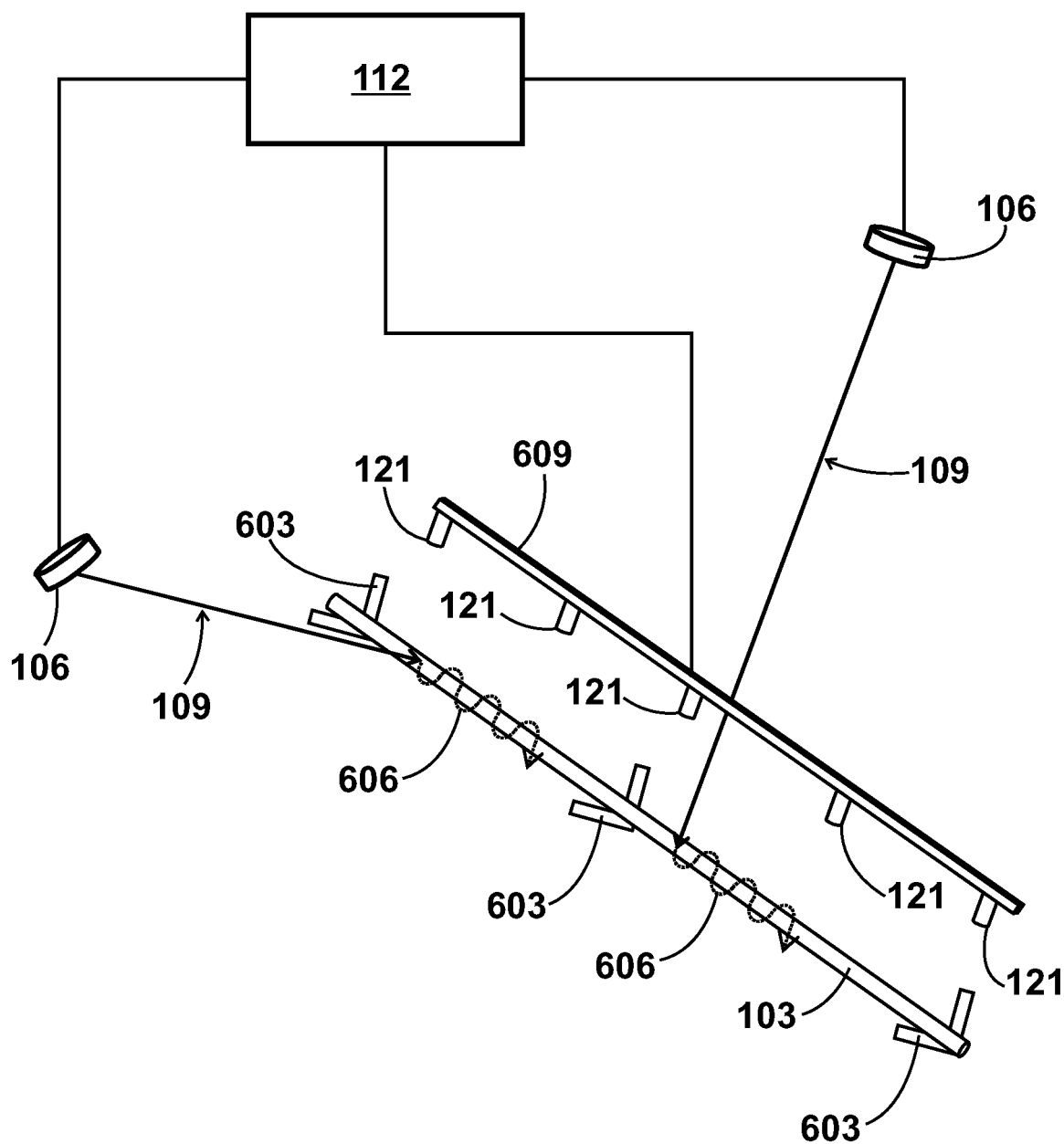
FIG. 6 in a perspective schematic view, shows a further exemplary embodiment of a device according to the invention with two radiation source modules that are spaced apart in the longitudinal direction and/or in the transverse direction of a long product and that are configured to generate punctiform measuring radiation, and with a radiation detector, which has a plurality of radiation receivers and which extends in the longitudinal direction of the long product and is arranged centrally between the radiation source modules in the transverse direction, wherein the radiation source modules are configured for the continuous scanning of the long product in the longitudinal direction.

In a schematic representation, FIG. 6 shows a further exemplary embodiment of a device according to the invention, wherein correlating elements are provided with the same reference signs in the exemplary embodiment discussed on the basis of FIG. 1 to FIG. 5 and in the exemplary embodiment according to FIG. 6 and, in part, will not be explained again in greater detail hereafter. In the exemplary embodiment according to FIG. 6, two laser scanners 106 of a radiation source module are present, which are arranged both in the longitudinal direction and in the transverse direction with respect to a bright steel bar 103 as an example of a long product, which is retained on a punctiform bearing 603 of a bearing unit. With the two laser scanners 106, the measuring radiation 109 can each be moved over a measurement section, advantageously without a change in direction in the longitudinal direction but predetermined and reproducible in each case, in the longitudinal direction of the bright steel bar 103 and, advantageously oscillating evenly, in the transverse direction of the bright steel bar 103, as is exemplified by the curve-like meandering scan paths 606.

In particular during a continuous scan-like movement in the longitudinal direction and in the transverse direction, the location information relating to the position of the areas of incidence 115 in the longitudinal direction of the bright steel bar 103 can be determined from a longitudinal speed and a transversal speed, each based on a reference time, or can be determined directly from the direction of the measuring radiation 109.

In the transverse direction of the bright steel bar 103, and thus preferably centrally between the laser scanners 106, the exemplary embodiment according to FIG. 6 has a radiation detection module 609 with a receiver bar 609, which is oriented in the longitudinal direction of the bright steel bar 103 and is populated with multiple radiation detectors 121 that advantageously are evenly spaced apart in the longitudinal direction of the bright steel bar 103.

In the exemplary embodiment according to FIG. 6, the laser scanners 106 are preferably arranged in the transverse direction of the bright steel bar 103 in such a way that their measuring radiation beams 109 are oriented at right angles to each other.

In the exemplary embodiment according to FIG. 6, deformations in the bright steel bar 103 and thus deviations from an ideal straightness can be determined proportionately in two dimensions.

Figure 7:
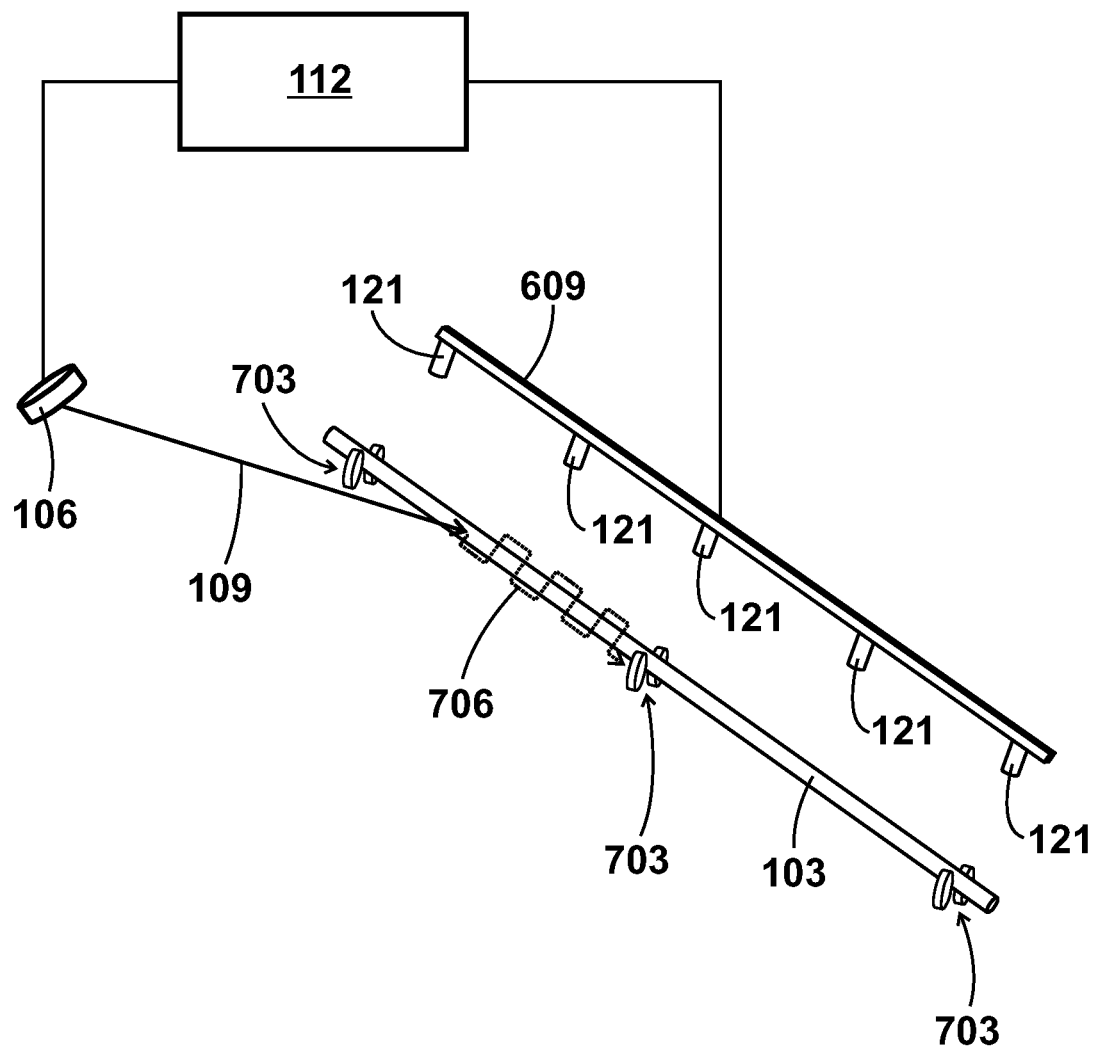
FIG. 7 in a perspective schematic view, shows a further exemplary embodiment of a device according to the invention that is similar to the exemplary embodiment according to FIG. 6 but is designed with only one radiation source module that gradually scans in the transverse direction.

FIG. 7 shows a further exemplary embodiment of a device according to the invention, wherein correlating elements are provided with the same reference signs in the embodiments discussed on the basis of FIG. 1 to FIG. 6 and in the exemplary embodiment according to FIG. 7 and will, in part, not be explained again in greater detail hereafter. The bearing unit in the exemplary embodiment according to FIG. 7 is equipped with a plurality of rotatable bearings 703, in which or with which a suspended bright steel bar 103 can be rotated over an angular range of preferably at least 90 degrees, but for the greatest precision when determining the straightness, as much as 360 degrees. In the exemplary embodiment according to FIG. 7, the radiation source module is configured with a laser scanner 106, which is designed to move gradually in the longitudinal direction of the bright steel bar 103 as an example of a long product, which in this case results in a rectangularly meandering scan path 706.

The exemplary embodiment according to FIG. 7 is distinguished by the rotatability of a long product about its longitudinal axis with an optical set-up that is relatively inexpensive and by the rectangularly meandering scan path 706 with relatively high precision.

Figure 8:
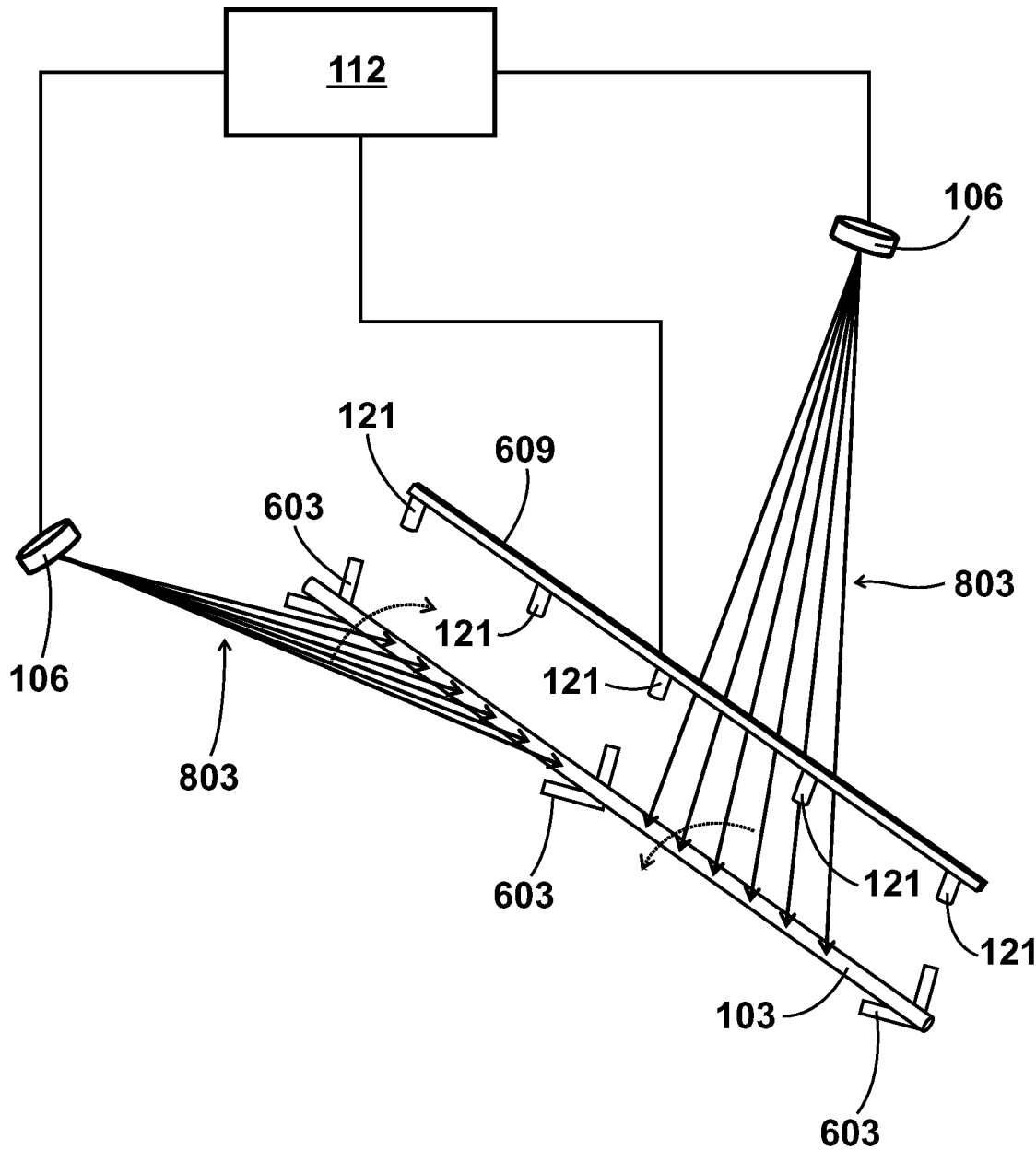
FIG. 8 in a perspective schematic view, shows a further exemplary embodiment of a device according to the invention that is similar to the exemplary embodiment according to FIG. 6 but is designed with linear measuring radiation oriented in the longitudinal direction.

In a schematic representation, FIG. 8 shows a further exemplary embodiment of a device according to the invention, wherein correlating elements are provided with the same reference signs in the aforementioned exemplary embodiments discussed on the basis of FIG. 1 to FIG. 7 and in the embodiment according to FIG. 8 and, in part, will not be explained again in greater detail hereafter. In contrast to the exemplary embodiment discussed on the basis of FIG. 6, the laser scanners 106 have beam-shaping optics, such as in the form of a cylindrical lens, with which it is possible to generate linear measuring radiation 803 in the longitudinal direction of a bright steel bar 103 as an example of a long product, said radiation being moveable at a transversal speed transversely to the longitudinal direction of the long product in question during a measurement cycle. In this way, a longitudinal section of a long product can be measured simultaneously with multiple radiation detectors 121 of a radiation detection module during a measurement cycle, the straightness can be determined therefrom.

Figure 9:
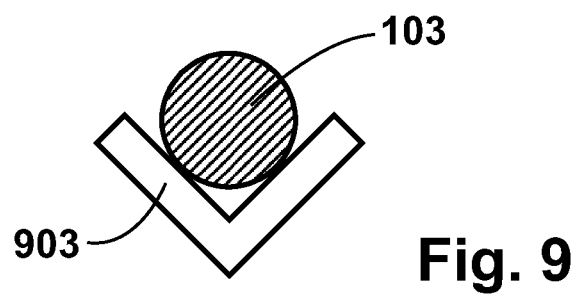
FIG. 9 in an end view, shows a punctiform bearing of a rigid bearing unit in an embodiment of a device according to the invention.
Figure 10:
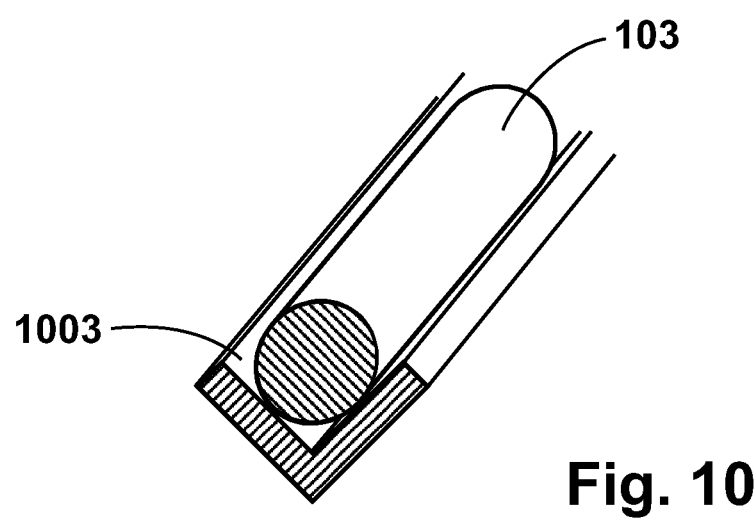
FIG. 10 in a perspective view, shows an elongate bearing of a bearing unit in an exemplary embodiment of a device according to the invention.
Figure 11:
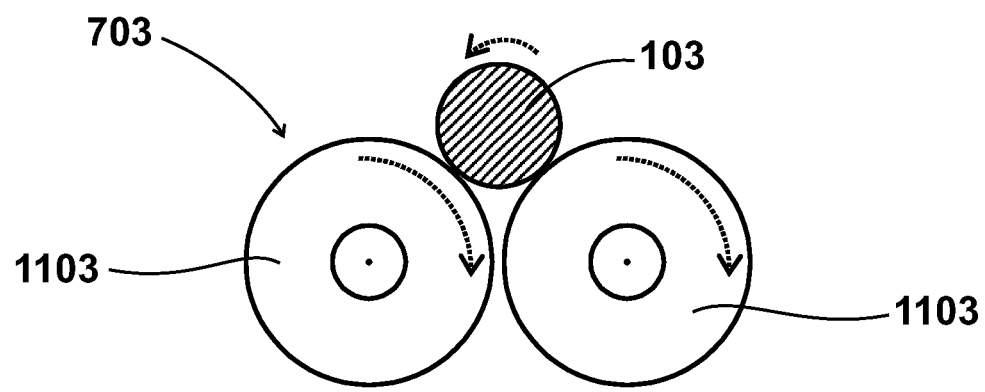
FIG. 11 in an end view, shows a bearing formed by two rotatable rollers in a bearing unit for an exemplary embodiment of a device according to the invention.

In graphic representations, FIG. 9 to FIG. 11 show various embodiments of bearing units for devices according to the invention.

FIG. 9 shows an end view of a bearing unit with a plurality of relatively short angled rail parts 903, which are arranged in the longitudinal direction of a suspended bright steel bar 103, for the static retention of the bright steel bar 103 at bearing points that are preferably equidistant from each other so that it is relatively simple to compensate for a bending of the bright steel bar 103 between the bearing points due to gravity by subtraction.

FIG. 10 shows a perspective view of a section of a bearing unit with an elongate angled rail 1003, with which it is possible to prevent the bending of a suspended bright steel bar 103 due to gravity and thereby avoid a corresponding computational compensation of the influence of gravity.

FIG. 11 shows an end view of a bearing unit for a device according to the invention, which has rotatable rollers 1103 which are disposed close together in the transverse direction and with which, when rotating clockwise, for example, a suspended bright steel bar 103 as an example of a long product can be rotated counter-clockwise in order to be able to apply measuring radiation 109, 803 to the bright steel bar 103 from different sides.

Figure 12:
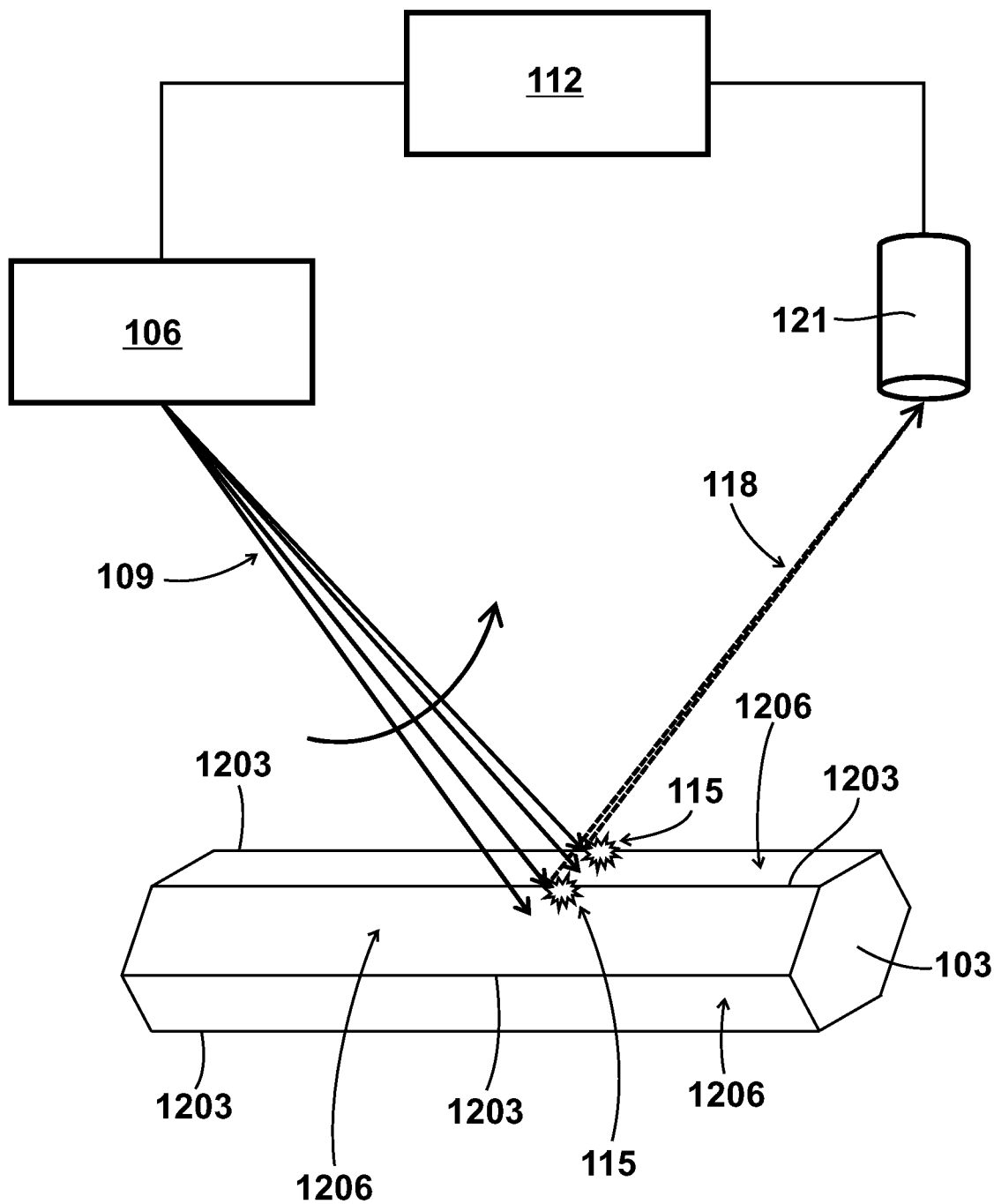
FIG. 12 shows a further exemplary embodiment of a device according to the invention in FIG. 1, with a long product having a hexagonal cross-section as an example of a non-round cross-section.

FIG. 12 shows a schematic representation of the exemplary embodiment of a device further embodiment of a device according to the invention in FIG. 1, in which a bright steel bar 103 as a long product with a hexagonal cross-section is shown as an example of a non-round cross-section. Because of the now flat outer surfaces 1206 between the edges 1203, multiple areas of incidence 115 are formed which have maximum intensity of detection radiation 118 during a measurement cycle but which can be clearly distinguished over time from deviations from an ideal straightness.

Figure 13:
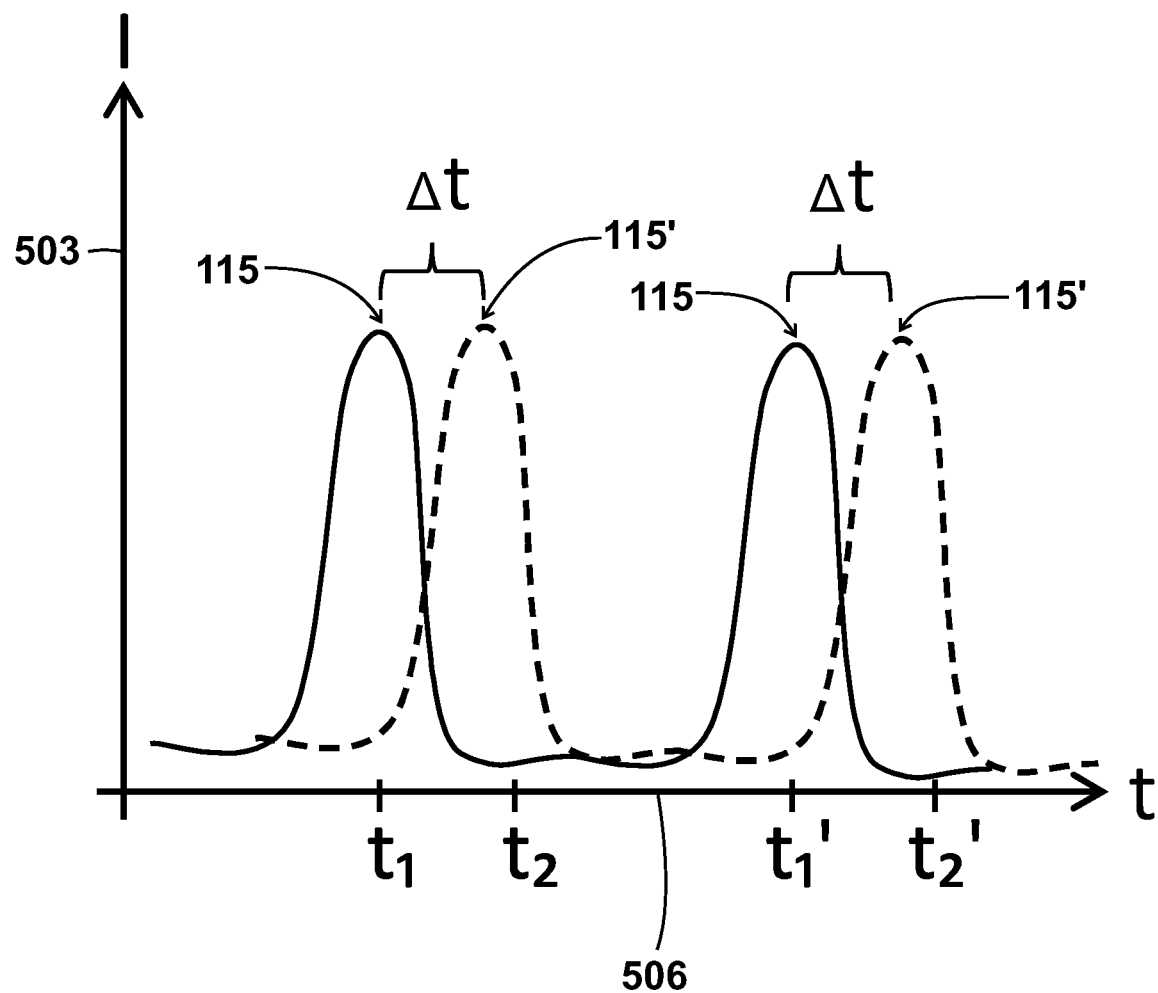
FIG. 13 shows the intensity curves of detection radiation that is back-scattered by the non-round and not exactly straight long product according to FIG. 12 and that is back-scattered by three flat sides abutted by edges on both sides.

In a diagram similar to FIG. 5 for the exemplary embodiment according to FIG. 12, FIG. 13 shows the temporal curve of the intensity of the measuring radiation 109 recorded by the radiation detector 121 when deviations from an ideal straightness occur in the hexagonal bright steel bar 103. It can be seen in FIG. 13 that the straightness of the hexagonal bright steel bar 103 can be clearly determined when deviations of Δt from an ideal straightness, which is less than the temporal intervals $t_1$, $t_1'$ and $t_2$, $t_2'$, respectively, between edges 1203 occur in the actual straightness of the hexagonal bright steel bar 103.

Figure 14:
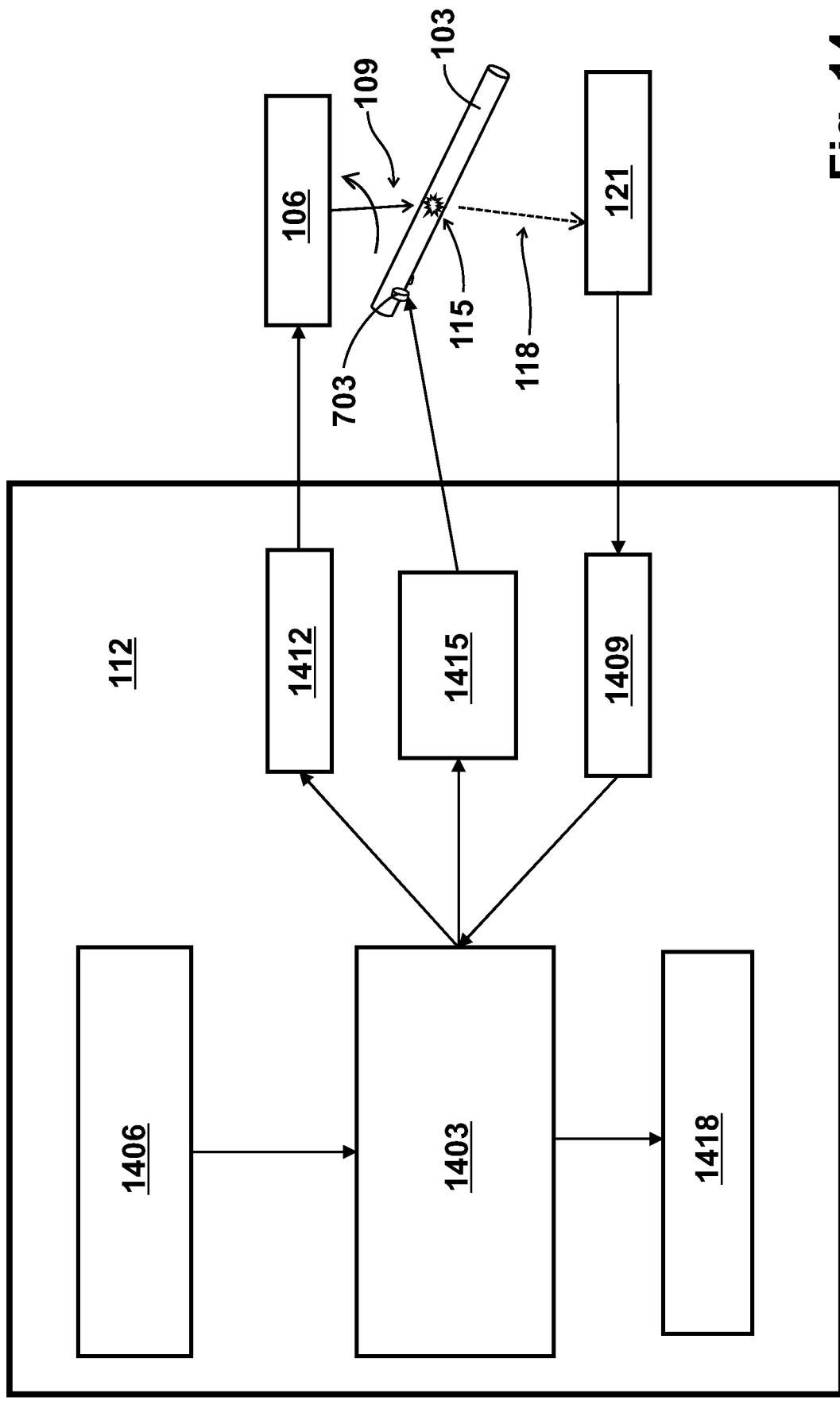
FIG. 14 in a block diagram, shows the exemplary design of a control and evaluation unit for a device according to the invention.

In a relatively highly simplified block diagram, FIG. 14 shows the structure of a typical control and evaluation unit 112 for an exemplary embodiment of devices according to the invention. The control and evaluation unit 112 has a central module 1403, into which can be fed the measurement parameters of an input module 1406 and from an analog/digital converter 1409 arranged downstream of the or of each radiation detector 121. Additionally, a digital/analog converter 1412 for activating the or each laser scanner 106 and a motor control module 1415 for rotating a bright steel bar 103 can be activated by the central module 1403. Finally, the control and evaluation unit has an output module 1418 for displaying the evaluated data about straightness, such as in the form of a good/bad display, acceptable/critical/unacceptable display or an exact straightness value display.

In an exemplary embodiment of a method according to the invention for calibrating a device according to the invention, as is demonstrated in the exemplary embodiments discussed above, a long product, such as in the form of a bright steel bar 103 of unknown straightness, is inserted into a bearing unit, and a measurement cycle is performed either by moving measuring radiation 109 in the transverse direction or by rotating the long product about the longitudinal axis, and at least one further measurement cycle is subsequently completed. The median values or the average values from characteristic intensity values such as the location of the maximum intensities of the detection radiation 118, for example, are then identified as significant data for reference values of a reference straightness, which then serves as a reference for determining the straightness of further long products.

In order to efficiently perform a method according to the invention for achieving a predetermined level of precision in determining the straightness of long products, it is practical for the step of rotating the long product of unknown straightness and Performing a measurement cycle be repeated until the distribution of the significant data has fallen below a predetermined maximum threshold value. In this way, the device is calibrated as exactly as the straightness of long products is to be determined later. This is practical in particular when there are changing batches with different straightness requirements.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for contactlessly determining the straightness of at least one long product, the device comprising:
at least one radiation source module for generating and emitting measuring radiation toward at least one long product where the measuring radiation is at least one of punctiform or linear, and extends linearly in the longitudinal direction of the long product;
at least one radiation detector for detecting the measuring radiation, as detection radiation, as modified by each long product at a plurality of areas of incidence distributed in a longitudinal direction of the long product;
a control and evaluation unit for determining the straightness of the long product from the data generated from the detection radiation;
wherein, during a measurement cycle, the measuring radiation is moved over the long product in a direction transverse to the longitudinal direction of the long product; and
each radiation detector is disposed such that, during the measurement cycle, a portion of measuring radiation that is back-scattered by the long product is detectable as detection radiation in a temporal curve of its intensity and, after at least one measurement cycle, the straightness of the long product is determined by the control and evaluation unit from location information about the position of areas of incidence in the longitudinal direction and from characteristic intensity values of the detection radiation and from a difference between a temporal position of characteristic intensity values of the detection radiation of the long product and a temporal position of characteristic intensity values of a detection radiation of a long product used as a reference and having a specific reference straightness.

2. The device of claim 1, wherein the characteristic intensity values include maximum intensities.

3. The device of claim 1, wherein the characteristic intensity values include significant intensity values at edges of an intensity distribution.

4. The device of claim 1, wherein the location information is based on previously known longitudinal speeds and transversal speeds during movement of the measuring radiation.

5. The device of claim 1, wherein the location information is based on directional information during movement of the measuring radiation.

6. The device of claim 1, wherein the measuring radiation is at least one of ultraviolet, visible and infrared radiation.

7. The device of claim 1, wherein each one radiation source module is further configured to move punctiform measuring radiation along a two-dimensional scan path over a measurement section in the longitudinal direction of the long product.

8. The device of claim 7, wherein the scan path extends over the measurement section without a change of direction in the longitudinal direction.

9. The device of claim 1, wherein at least two radiation detectors are provided, which are spaced apart in the longitudinal direction of the long product.

10. The device of claim 9, wherein at least two radiation source modules are provided, which are spaced apart in the transverse direction of the long product.

11. The device of claim 1, wherein at least two radiation source modules are provided, which are spaced apart in the longitudinal direction of the long product.

12. The device of claim 1, further comprising a bearing unit for rotating the long product about its longitudinal axis.

13. A method for calibrating the device of claim 1, comprising the steps of:
- inserting a long product of unknown straightness into a bearing unit;
- carrying out a measurement cycle;
- rotating the long product about its longitudinal axis at least once and carrying out a further measurement cycle; and
- identifying data from characteristic intensity values of the detection radiation from a plurality of measurement cycles as reference values for a reference straightness.

14. The method of claim 13, wherein the data include median values of characteristic intensity values.

15. The method of claim 13, wherein the data include average values of characteristic intensity values.

16. The method of claim 1, wherein, during the measurement cycle, the long product remains stationary, and the measuring radiation is moved over the stationary long product in the direction transverse to the longitudinal direction of the long product.

* * * * *